April 10, 1956  J. C. RANKIN  2,741,746
HIGH FREQUENCY ATTENUATING DEVICE
Filed Oct. 24, 1951  2 Sheets-Sheet 1

Inventor
John C. Rankin
By J. Irving Silverman
Attorney

April 10, 1956            J. C. RANKIN            2,741,746
HIGH FREQUENCY ATTENUATING DEVICE
Filed Oct. 24, 1951            2 Sheets-Sheet 2
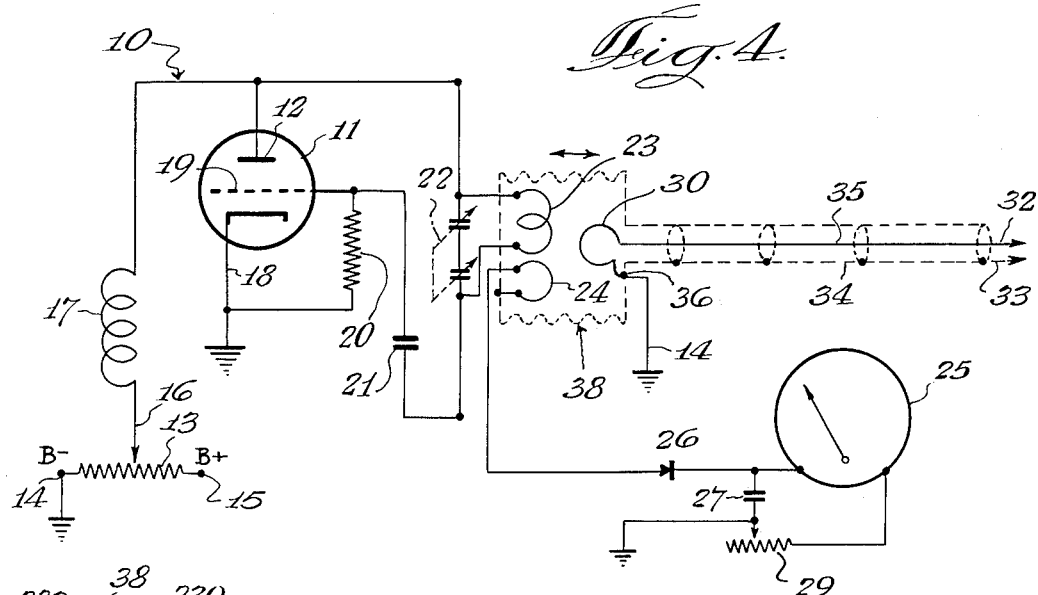
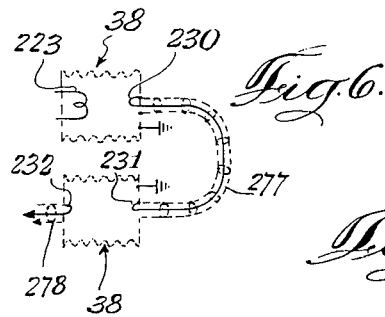
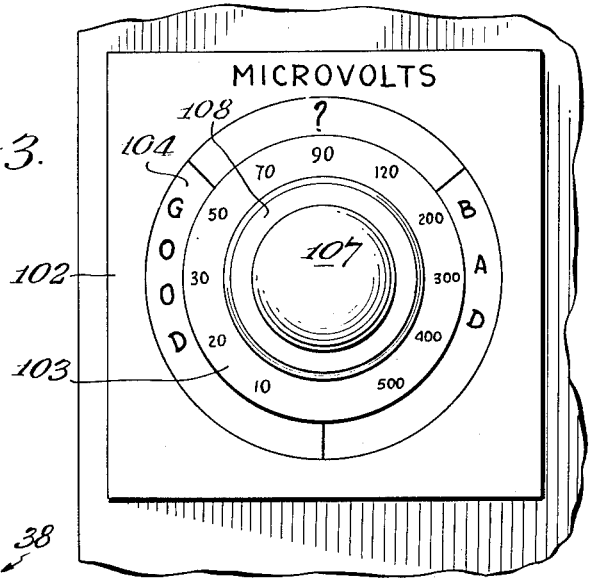
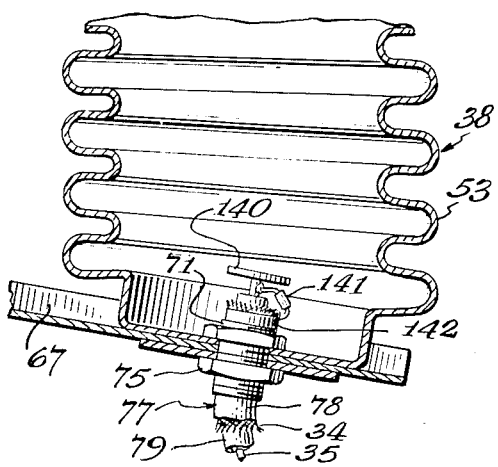
Inventor
John C. Rankin
By J. Irving Silverman
Attorney ial view of an instrument having my
United States Patent Office 2,741,746
Patented Apr. 10, 1956

2,741,746

HIGH FREQUENCY ATTENUATING DEVICE

John C. Rankin, Chicago, Ill.

Application October 24, 1951, Serial No. 252,960

2 Claims. (Cl. 333—81)

This invention relates generally to high frequency attenuating devices and more particularly is concerned with a novel attenuator construction suitable especially for use in connection with calibrated indicating means to enable the amount of attenuation achieved to be measured during the use of the device.

The device is especially useful in measuring instruments, such as for example high frequency meters for measuring output and gain, noise level meters, and the like. It may be utilized by engineers qualitatively and quantitatively and is especially suitable for the latter type of measurement by virtue of certain constructional features hereinafter to be set forth.

I have had considerable success with the device in measuring overall gain of radio frequency receiving instruments, such as radios and television equipment. In such use, I provide an oscillator having one or more known frequencies corresponding to predetermined frequencies of the equipment the gain of which is to be measured. The output circuit of the said oscillator is coupled with an attenuating device constructed in accordance with my invention, and the signal thereof is fed to the equipment which has been tuned to the frequency of the oscillator. An output measurement is made at a given point of the equipment, such as for example, a measurement across the video detector load resistor. The attenuating device may be calibrated in any manner desired so that at a given value of output of the equipment, the indicator of the attenuating device will read a certain value. This value may be a measure of the sensitivity of the equipment.

One of the objects of the invention is the provision of the particular attenuating device; another, the provision of the attenuating device in combination with means for varying the coupling between the pick up element of the device and the output of the signal producing equipment; another is the provision of an instrument suitable for measuring the sensitivity of radio frequency receiving equipments (the word radio hereinafter being used in its adjectival sense to distinguish between it and audio frequencies).

In connection with the last mentioned object, I provide an attenuator having an indicating device calibrated both in micro-volts of output and in general qualitative designations, namely "good," "bad" and "questionable," the latter being indicated by a question mark. Obviously, the calibration is valid for certain conditions of operation of the oscillator and for a given output measured, such as for example one volt at the video detector output resistor. Under such circumstances, the sensitivity can be read directly upon the attenuator indicating dial in micro-volts of signal that must be induced in the antenna of the equipment, a television receiver for example, in order to provide one volt of output at the particular resistor. Obviously, such an instrument enables one to predict the performance of a given piece of equipment in fringe areas without the necessity of taking the equipment out to the location and setting the same up.

One of the principal objects of the invention is to provide an attenuating device for uses of the general character alluded to above, which device is extremely simple and economical so that instruments can be built utilizing the same, which by virtue of their ease of operation and extremely low cost will be more readily available to the purchasing public so that the use of such instruments will be more wide spread.

In connection with the above object it is pointed out that heretofore attenuating devices serving the identical purpose as that of the herein invention have been objectionable from three principal standpoints. In the first place they have been expensive to manufacture and hence expensive to purchase. In the second place, they have been comparatively complicated, making same difficult to assemble, difficult to operate, and likely to get out of order. In the third place, they have been of a type occupying considerable space or volume such that the instrument with which the same has been used had to be large and unwieldy and difficult to carry and use.

The types of devices especially referred to are the piston type of attenuator, and the rotating coil type.

Objects of this invention are to alleviate the difficulties above referred to and provide an attenuator that is simple to produce and operate; that is extremely compact; that has no relatively moving parts directly associated with the coupling elements; that has no pulleys or sliding tubes or cylinders; that is formed of simple and easily obtainable parts and readily assembled in a small space, and yet that will operate with the greatest of efficiency and precision.

A further object of the invention is to provide a novel attenuating device in which the output element and the pickup element are moved towards and away from one another within a single continuous wall member of resilient collapsible construction, said wall member completely enclosing and shielding the inductive field of and between the said elements.

Still a further object of the invention is to provide an attenuator which will include a shielding conduit of bellows construction.

Another object of the invention is to provide an attenuator which is made up of a plurality of bellows.

Still a further object of the invention is to provide an attenuator of the character described in which the field producing element and the pick-up element are completely enclosed at all times.

With the foregoing and other objects in view which will appear more fully as the description of the invention proceeds, the invention lies in certain structural aspects of the attenuating device and in the manner in which same is combined with other elements to give rise to the objects and many advantages not specifically set forth, but certainly apparent to those skilled in the art. In keeping with statutory requirements, a practical embodiment comprising my preferred form has been illustrated and described in considerable detail in order to make known the manner of practising the invention and carrying out the same.

In the drawings in which like or similar characters of reference designate the same or similar parts throughout the several figures of the drawings:

Fig. 3 is a front elevational view of the indicating means provided on the face of the instrument of Fig. 1 used in connection with the attenuating device.

Fig. 4 is a diagrammatic view of an electrical circuit suitable for use with the instrument of Fig. 1.

Fig. 5 is a fragmentary sectional view similar to that of Fig. 2, but illustrating a modified form of the invention.

Fig. 6 is a schematic diagram showing the manner in which a plurality of attenuating devices may be utilized.

Figure 1:
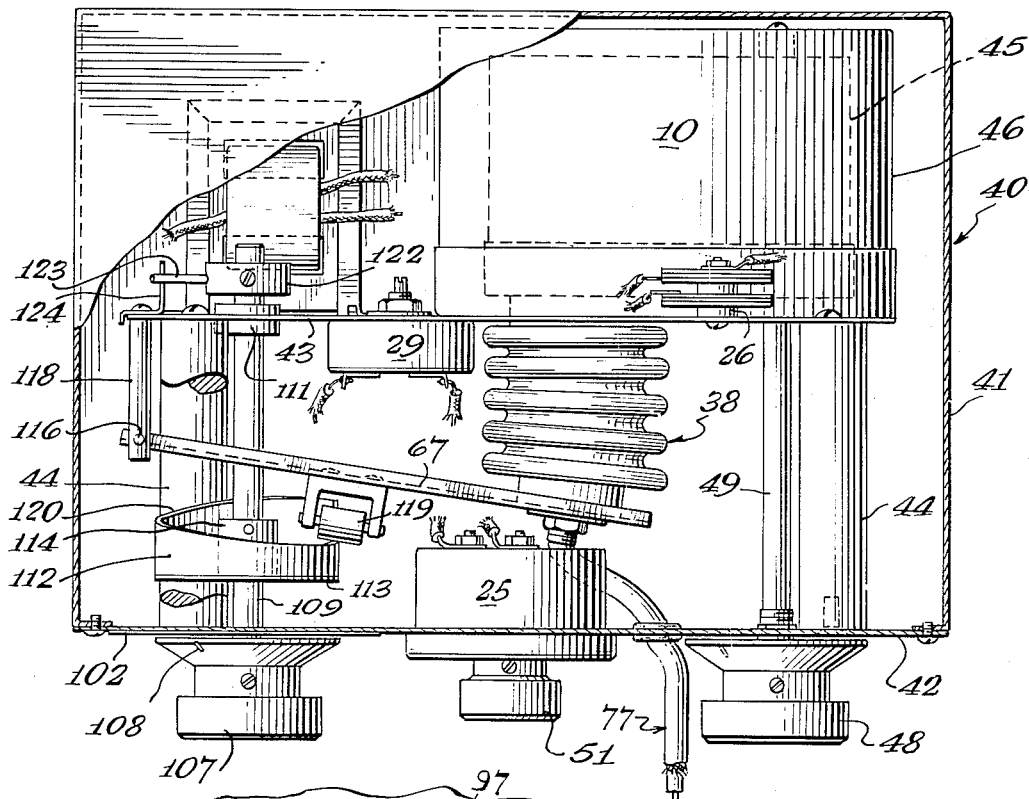
Fig. 1 is a top plan view of an instrument having my new attenuating device associated therewith, parts of the outer casing being broken away to show the interior details thereof.

Generally, my invention is based upon a novel construction for an attenuator which will give rise to the advantages and objects set forth hereinabove. The pick-up element or probe is associated with a source of electrical energy by placing same in the field created, for example, by the tank circuit of as oscillator. The pick-up element is moved so that it approaches the electrical field of the source of energy or moves away from the said field. Obviously, the amount of energy coupled to the pick-up bears a suitable relationship with the distance between the pick-up element and the field.

Especially in high frequency measurements, it is essential that the pick-up element and electrical field of the tank circuit of the oscillator be shielded to prevent radiation, spurious coupling, reflections, etc. My invention eliminates a great deal of the expensive apparatus heretofore used to achieve such shielding by enclosing the entire tank coil as well as the pick-up element in a chamber, the side walls of which are pleated so that as the ends of the chamber are compressed, the walls uniformly will collapse, much as the bellows of a camera or an accordion. The coil of the tank circuit or other output elements of the source of energy is mounted on the inside of one end of the collapsible chamber and the pick-up element to be coupled to the source of energy is connected to the other end of the chamber. The side walls of the chamber are of metal or metallized so as substantially completely to enclose the entire device, and mechanical means is provided to move the walls one relative to the other in adjusting the coupling between the pick-up element and the tank coil. There is an indicator operating in synchronism with the mechanical actuating device which is calibrated to give readings proportional to the quantitative coupling between pick-up coil and tank coil. The dial may have exponential indicia so that the mechanical actuating device can move the end walls of the chamber at uniform rates, or it may have any rate of change of attenuation indicated thereon which can be achieved by varying the mechanical elements of the actuating device.

The particular actuating device illustrated is only an example of the manner of moving the end walls of the chamber. This can be done by gears, pulleys, levers, cams, etc., following kinematic laws predetermined to give certain rates of change.

Prior to describing the details relative to the attenuating device in particular, attention is invited to Fig. 4 to point out the manner in which the attenuating device is utilized in an instrument for measuring the sensitivity of television receiving equipment.

The reference character 10 designates generally an oscillator of the Colpitts type which includes a triode 11, the plate 12 of which is connected to a suitable plate supply. There is shown a voltage dropping resistor 13 having one end connected to ground 14 and the other end connected to some value of potential above ground as indicated schematically at 15. The plate 12 is connected to the slider 16 through a radio frequency choke 17. In practice, the slider will be adjusted so that the plate current is a given amount corresponding with the standard conditions under which the instrument 10 has been calibrated at any given frequency.

The cathode 18 of the triode 11 is grounded and connected to the grid 19 through the high ohmage resistor 20 for grid-leak biasing purposes. The tank circuit is connected between plate and grid in the usual manner, with a series capacitor 21 for adjusting the amount of feedback and keeping D. C. out of the grid. The tank circuit has a gang capacitor unit 22 in parallel with the fixed inductive part of the tank. The latter is in the form of a few loops of wire 23 to which the pick-up element is to be coupled. A small coil 24 is inductively coupled to the tank coil 23 and it receives sufficient energy to give a reading on the galvanometer 25 that corresponds to a measure of the plate current. The coupling between inductances 23 and 24 is fixed so that the strength of the field of the tank coil 23 will control the current produced in the meter circuit. The A. C. is rectified at 26 and any R. F. that gets through the rectifier 26 is by-passed to ground through capacitance 27. The resistor 29 is a means for adjusting the sensitivity of the meter 25.

The pick-up element consists of a loop of wire 30 coupled to the field of the tank coil 23 and connected by a suitable transmission path to the output connectors 32 and 33. In the illustrated example, the transmission path is a co-axial cable having an outer shielding member 34 and an inner conductor 35. The shielding member is grounded as indicated at 36 to ground 14. It will be noted that the entire field of the tank coil 23, including coil 24 and the loop 30, are shown enclosed within a shielding member symbolically indicated by the broken line outline 38 of Fig. 4. This shielding member is a completely enclosed collapsible chamber of conducting material which will be described in some detail hereinafter. It will be seen that there are no other members, no pistons, no telescoping tubes, no Faraday shields needed, and no complicated apparatus to achieve the variation of coupling desired between loop 30 and tank coil 23. This is accomplished merely by increasing or decreasing the length of the member 38.

Figure 2:
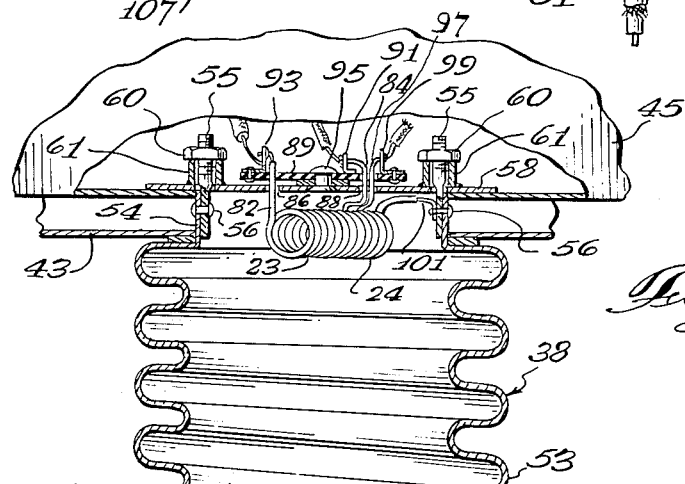
Fig. 2 is an enlarged sectional view through the attenuating device showing the construction thereof.

Referring now to Figs. 1 and 2, it will be seen that I have provided an instrument 40 embodying the circuit of Fig. 4 and having the novel attenuating device built into the same. The instrument can be considered a signal generator having a variable coupling with the apparatus being tested and having means for measuring the attenuation of the coupling in terms of the sensitivity of the apparatus being tested. There is an outer metal housing 41 having a front panel 42 suitably assembled thereto. Spaced from the rear of the panel on the interior of the housing 41 there is mounted a metal partition 43 to serve as a base for the sub-chassis of the instrument. The partition 43 is secured to spacing pillars 44 which in turn are mounted on the rear face of the front panel 42. To the rear of the partition 43 I mount the oscillator 10 well-shielded in a cannister 45 contained within a cannister 46. Obviously both cannisters are grounded.

The ganged capacitance 22 is varied by means of a knob 48 mounted on the front panel 42 and connected to an elongate shaft 49 which passes through the partition 43 and into the inner cannister 46 and connects with the capacitance. The sensitivity adjusting resistance 29 may also be mounted on the partition 43 as well as the rectifier 26. The front panel 42 also mounts the potentiometer 13 for plate potential control, only the control knob 51 of which may be seen in Fig. 1, and the meter 25 which is mounted above the potentiometer 13.

Referring now to Fig. 2, the attenuator of my instrument is there shown in an enlarged view. Same is designated generally 38, and it will be seen that the particular form illustrated is constructed from a metallic bellows. This is an extremely thin walled article, possibly of Phosphor bronze in order to have great resilience, and is the identical type used in pressure sensitive devices, such as meteorological instruments. It has great strength, is entirely of metal, is readily collapsed without substantial loss of symmetry with respect to its central axis, and is readily available and economical.

The particular bellows shown has alternately formed annular sections having convex and concave circumferential formations. The manner in which the bellows will collapse, i. e. decrease in length and extend, is believed obvious. It is to be noted that the walls are exaggeratedly thicker than normal in order to render illustration simple. The bellows could be made of metallized cloth, or formed of pleated members much like the bellows of a camera, accordion, or the like. By virtue of such formation, there is formed a continuous metallic chamber which is collapsible in a controlled manner and which shields the coupling between the pick-up element and the tank coil of the oscillator 10.

The collapsible chamber is designated 53 and has its inner end opening to the inside of the inner cannister 45 and hence same need not be made of metal. An annular cuff 54 extends through the partition 43 and has diametrically opposed studs 55 riveted thereto at 56. The studs extend through an end plate 58 and are engaged by suitable nuts 60 and spacer washers 61 to hold the chamber 53 and the plate 58 secured to the partition 43. Obviously any suitable grounding connection securing the upper end of the bellows to the sub-chassis can be used.

At its lower end, the chamber 53 is closed off by an integral wall 63 on the end of an annular cuff 65 formed on said end. The wall 63 is soldered or brazed to a metallic arm 67 and may be well-grounded thereto by the solder at 69. A bushing 71 extends through the wall 63, arm 67, and a large washer 73 and is fastened by nuts 75. Through the bushing 71 there extends the end of a coaxial cable 77. The cable is formed of an outer rubber covering 78, an inner woven copper shield 34, an inner insulating layer 79 of polystyrene or the like, and having an inner conductor 35. Any coaxial cable may be used having well-known constructions. The particular output is intended to have one side thereof grounded, and hence only one "live" lead is required. Under other requirements, i. e., for balanced outputs, there may be two leads insulated from ground, perhaps in a transmission line.

On the inside of the chamber 53, the free end of the inner conductor 35 is looped upon itself as shown at 30 and soldered to the grounded shielding 34 and the bushing 71 at 80. This provides an inductive pick-up element of low impedance.

The opposite end of the chamber 53 has the loops 23 of the tank circuit coil mounted inside of the end wall 58. Any suitable construction can be used, but as seen, the winding 23 is made of wire having sufficient stiffness to be self sustaining. The ends 82 and 84 extend through the openings 86 and 88 respectively which are formed in the end wall 58 and led through an insulating block member 89 to be soldered to the lugs 91 and 93 respectively. The lugs are fastened to the block and the block in turn is secured to the rear face of the wall 58 and spaced therefrom by the rivet 95 and a washer. The lugs serve a terminals to enable securement of other electrical conductors thereto. The meter pick-up coil 24 is positioned alongside the coil 23 and has one terminal 97 passing through the opening 88 and soldered to the lug 99 while the other terminal 101 is suitably grounded by soldering or the like.

In the use of the instrument 40, the attenuating device 38 is operated to collapse or extend the chamber 53 which varies the coupling of the loop 30 with the field of the tank coil 23. This increases or decreases the signal being fed to through the coaxial cable 77 to the apparatus being tested. The less the signal required to be fed to the coaxial cable, the greater the sensitivity of apparatus being tested. The distance that the chamber 58 is decreased in length is suitably calibrated in terms of microvolts of signal being fed to the coaxial cable. A suitable scale may be provided for indicating such movement, and various contrivances for evolving such indicating devices will immediately occur to the artisan.

It is a simple matter to provide a helical screw having a cross head engaging the end wall 63 so that turning the screw will collapse the chamber 53, and the distance of the cross head along the screw can be calibrated to read directly the microvolts of signal produced in the output. In another scheme, the screw may have a knob operating over a dial calibrated properly.

I have illustrated a mechanism which is advantageous because it enables the entire range of movement of the collapsible chamber to be achieved in less than 360° of rotation if desired, and in addition, it enables the scale of the indicating device to be adjusted to any desired law of indication. Rotative movement of a knob is converted into substantially rectilinear movement of the end wall 63. A pivoted lever has a roller which rides a generally helical cam. The lever is used to multiply the movement due to the pitch of the cam, and in addition, the rate of change of the pitch of the cam may be varied in accordance with any desired law to crowd or spread the scale. I have found that by a simple constant pitch cam I can achieve a spread of calibrated points well suited for sensitivity measurements of television receivers. The logarithmic nature of the attenuation due to variation of coupling adjusts the resulting scale satisfactorily, since this device acts as a wave guide beyond cut-off.

Referring now to Figs. 1 and 3, I provide a plate 102 on the front panel 42 having a circular scale 103 provided thereon marked off in numerals representing microvolts of signal. The scale may be logarithmic with respect to the spread of numerals, the distance between adjacent marking being about five times greater at the end of the scale than at the beginning. A somewhat qualitative scale 104 is also provided about the numerical scale. It is marked "Good," "?" and "Bad." Since this particular instrument is especially useful to measure sensitivity of television receivers, especially for use in fringe areas, through experience it may be determined that for satisfactory reception, a receiver shall have sufficient gain up to the video detector load resistor such that a signal of up to about 50 microvolts input will result in a one volt signal at the detector. Likewise it may be determined that where the input signal required for a given receiver to produce that voltage is approximately between 50 and 200 microvolts, the reception of signals by that receiver may not be satisfactory. Thus, where more than about 200 microvolts are required in the antenna in order to achieve a one volt output at the detector, the sensitivity of the particular receiver may be considered unsatisfactory for fringe area reception.

To cooperate with the scales 103 and 104 I provide a knob 107 and a pointer 108 mounted on a shaft 109 that is journalled at 111 upon the partition 43. A helical cam 112 is mounted upon the shaft 109 on the interior of the housing 41. The cam is formed of a cylindrical member having an end plate 113 to which is secured a bushing 114 which in turn is secured to the shaft. The arm 67 has one end secured to the end of the attenuator chamber 53 as previously described and has its other end pivotally mounted at 116 to a standard 118 secured to the partition 43. Between its ends, the arm 67 carries a roller 119 which rides upon the cam edge 120 of the cam 112. It will be seen that the rotation of the knob will extend or collapse the chamber 53. It is advantageous to form the chamber 53 of the type of thin walled metallic bellows mentioned hereinabove, since said bellows have an inherent resilience opposing collapse. The result of this quality is that the roller 119 is thus constantly urged against the cam edge, eliminating play, and the necessity of springs for retaining the chamber 53 in its expanded condition. The shaft end may be provided with a collar 122 having a pin 123 cooperating with a stop member 124 to limit the rotation of the shaft 109.

In Fig. 5, I have shown a modified form of the invention which differs in only one respect from the attenuating device of Fig. 2. Instead of an inductive element being used for pick-up purposes, a capacitive element may be used. Here, a small plate 140 is electrically connected to the center conductor 35 of the coaxial cable 77 and at high frequencies there will be sufficient coupling between the plate 140 and the tank coil 23 to result in a signal being picked up. In order to prevent the coaxial cable from acting as though it were open ended, a small resistor 141 is connected from the center conductor to ground as indicated at 142. The resistor may be about 50 ohms for the ordinary coaxial cable so that a characteristic impedance termination is approached.

It is desired to emphasize that the attenuating device 38 is not necessarily limited in use to the instrument here described. It can be used for feeding signals obtained from high frequency fields to measuring instruments, the amount of attenuation being varied by varying the distance of the loop 30 from the opposite end of the chamber 53. The said opposite end may be constructed to remain open so that it can be placed adjacent a suitable source of energy such as a field. The distance that the chamber 53 must be collapsed in order to achieve a given signal strength can be calibrated in decibels, or a series of measurements can be taken with the chamber 53 in various states of collapse corresponding to known values of attenuation.

It is often useful to achieve greater attenuation, either by means of a single controlling movement or by means of a multiplicity of controlling movements. Thus, the invention is adapted to the use of a plurality of attenuating devices 38 connected in cascade as shown in Fig. 6. Here a tank coil 223 is arranged in the upper bellows, and a coaxial cable 277 extends between the bellows, having loops 230 and 231 formed at opposite ends. Loop 230 functions as a pick-up element, and loop 231 as a field producing element. The pick-up element of the lower bellows is a loop 232 in the output coaxial cable 278. The bellows here may be connected to collapse and extend together or separately. The total attenuation is of course increased greatly, and various arrangements of multiplication, coarse and fine calibration, etc., may be achieved.

The bellows or chambers of the device may be made totally waterproof and air-tight if desired, for certain conditions of operation, by reason of their single wall construction.

Many other uses of the attenuating device besides those herein described will occur to those skilled in the art, and it should be obvious that the advance in the arts and sciences engendered by my invention is substantial. It is believed that no further explanation is required and it is desired to point out that the invention is capable of divers variations and changes in detail without in any way affecting the operation and use thereof. It is desired to be limited only by the language of the claims interpreted as broadly as justified commensurate with the prior art.

What I claim and desire to secure by Letters Patent of the United States is:

1. In a device of the character described and which includes a radio frequency oscillator having an output tank coil, the oscillator being contained in a shielding housing, the energy from the oscillator adapted to be transmitted through the medium of the tank coil, electrical transmission means for conducting the energy to an outside receiving device and having a pick-up element mounted on an end thereof adapted to be coupled to the tank coil; an attenuator including a metal bellows having two ends, one end being secured to the oscillator housing and having a wall thereat, the tank coil being insulatedly mounted on the wall on the interior of the bellows and connected with the oscillator through the wall, the second end having a closing wall of conducting material and the electrical transmission means being secured thereto with said pickup element on the interior of the bellows and means for varying the length of the bellows to vary the coupling between the pick-up element and the tank coil comprising, a pivotally mounted lever connected at an end thereof to said bellows, a rotatably mounted cylindrical cam member having a constant pitch cam edge, a roller on said lever arranged to ride said edge with said bellows maintaining the roller in constant engagement with the cam edge, and manually operable means for rotating said cylindrical cam to vary the length of the bellows and having an indicator scale cooperating therewith for determining the amount of said coupling as a function of the length of said bellows.

2. In a device of the character described and which includes a radio frequency oscillator having an output tank coil, the oscillator being contained in a shielding housing, the energy from the oscillator adapted to be transmitted through the medium of the tank coil, electrical transmission means for conducting the energy to an outside receiving device and having a pick-up element mounted on an end thereof adapted to be coupled to the tank coil; an attenuator including a metal bellows having two ends, one end being secured to the oscillator housing and having a wall thereat, the tank coil being insulatedly mounted on the wall on the interior of the bellows and connected with the oscillator through the wall, the second end having a closing wall of conducting material and the electrical transmission means being secured thereto with said pick-up element on the interior of the bellows, means for varying the length of the bellows to vary the coupling between the pick-up element and the tank coil, and indicating means mechanically connected with said last-mentioned means for indicating the amount of said coupling as a function of the length of said bellows.

References Cited in the file of this patent

UNITED STATES PATENTS

| | | |
|---|---|---|
| 1,901,827 | Stokes | Mar. 14, 1933 |
| 2,159,782 | Conklin | May 23, 1939 |
| 2,296,678 | Linder | Sept. 22, 1942 |
| 2,404,226 | Gurewitsch | July 16, 1946 |
| 2,492,155 | Kandoian | Dec. 27, 1949 |
| 2,630,532 | Guanella | Mar. 3, 1953 |
| 2,659,817 | Cutler | Nov. 17, 1953 |